(12) United States Patent
Dietrich et al.

(10) Patent No.: US 7,369,860 B2
(45) Date of Patent: May 6, 2008

(54) DATA PROTECTION FOR POSITION-DEPENDENT SERVICES

(75) Inventors: Hans-Martin Dietrich, Eching A. A (DE); Thomas Holzhauer, München (DE)

(73) Assignee: Siemens Aktiengesellschaft, Munich (DE)

( * ) Notice: Subject to any disclaimer, the term of this patent is extended or adjusted under 35 U.S.C. 154(b) by 296 days.

(21) Appl. No.: 10/501,750

(22) PCT Filed: Jan. 8, 2002

(86) PCT No.: PCT/DE02/00027

§ 371 (c)(1),
(2), (4) Date: Jul. 15, 2004

(87) PCT Pub. No.: WO03/058994

PCT Pub. Date: Jul. 17, 2003

(65) Prior Publication Data

US 2006/0040677 A1 Feb. 23, 2006

(51) Int. Cl.
*H04Q 7/20* (2006.01)
(52) U.S. Cl. ............... 455/456.2; 455/432.1; 455/440; 455/410; 342/357.01
(58) Field of Classification Search ......... 455/456.2, 455/456.1, 456.3, 432.1, 440, 457, 414.2, 455/410, 411; 342/357.09, 357.01, 357.08
See application file for complete search history.

(56) References Cited

U.S. PATENT DOCUMENTS

| | | | |
|---|---|---|---|
| 5,960,341 A | 9/1999 | LeBlanc et al. | |
| 6,154,644 A | 11/2000 | Murray | |
| 6,212,391 B1 | 4/2001 | Saleh et al. | |
| 6,311,069 B1 * | 10/2001 | Havinis et al. | 455/456.4 |
| 6,944,447 B2 * | 9/2005 | Portman et al. | 455/422.1 |
| 6,957,073 B2 * | 10/2005 | Bye | 455/456.1 |
| 6,961,417 B2 * | 11/2005 | Koch | 379/207.02 |

(Continued)

OTHER PUBLICATIONS

Jane D. Humphrey, "Interworking and the IN Platform: Detailing the Development of the GSM Camel Standard for Interworking IN", 6th IEEE Conference on Telecommunications, Edinburgh, UK, Mar. 29-Apr. 1, 1998, IEE Conference Publication, London, IEE, UK, vol. No. 451, Mar. 29, 1998, pp. 250-257, XP000880801.

*Primary Examiner*—Nghi H. Ly
(74) *Attorney, Agent, or Firm*—Bell, Boyd & Lloyd

(57) ABSTRACT

The invention relates to a privacy function check which is efficient in terms of network load, and is carried out by means of a method for requesting the agreement of a user of a mobile radio terminal of a mobile radio network, relating to the transmission of the position data of said terminal to a requester requesting said position data. In the event of an arrival of one such request in a switching center of the mobile radio network, said switching center prompts a database server to check, by means of consultation information stored in the server and relating to the mobile radio terminal, whether an agreement must be obtained from the mobile radio terminal in order to transmit the position of said terminal to the requester, the result of the check then being sent to the switching center. At least when the result indicates that an agreement must be obtained, a request for the agreement is sent from the switching center to the mobile radio terminal, and, if an agreement is obtained, the position of the terminal is transmitted to the requester.

15 Claims, 3 Drawing Sheets

U.S. PATENT DOCUMENTS 6,968,196 B1 * 11/2005 Back et al. ............... 455/456.5
6,978,142 B2 * 12/2005 Jokimies ..................... 455/449
2001/0014604 A1 * 8/2001 Kingdon et al. ............ 455/427
2001/0055975 A1   12/2001 McDonnell et al.

* cited by examiner (3GPP R4)

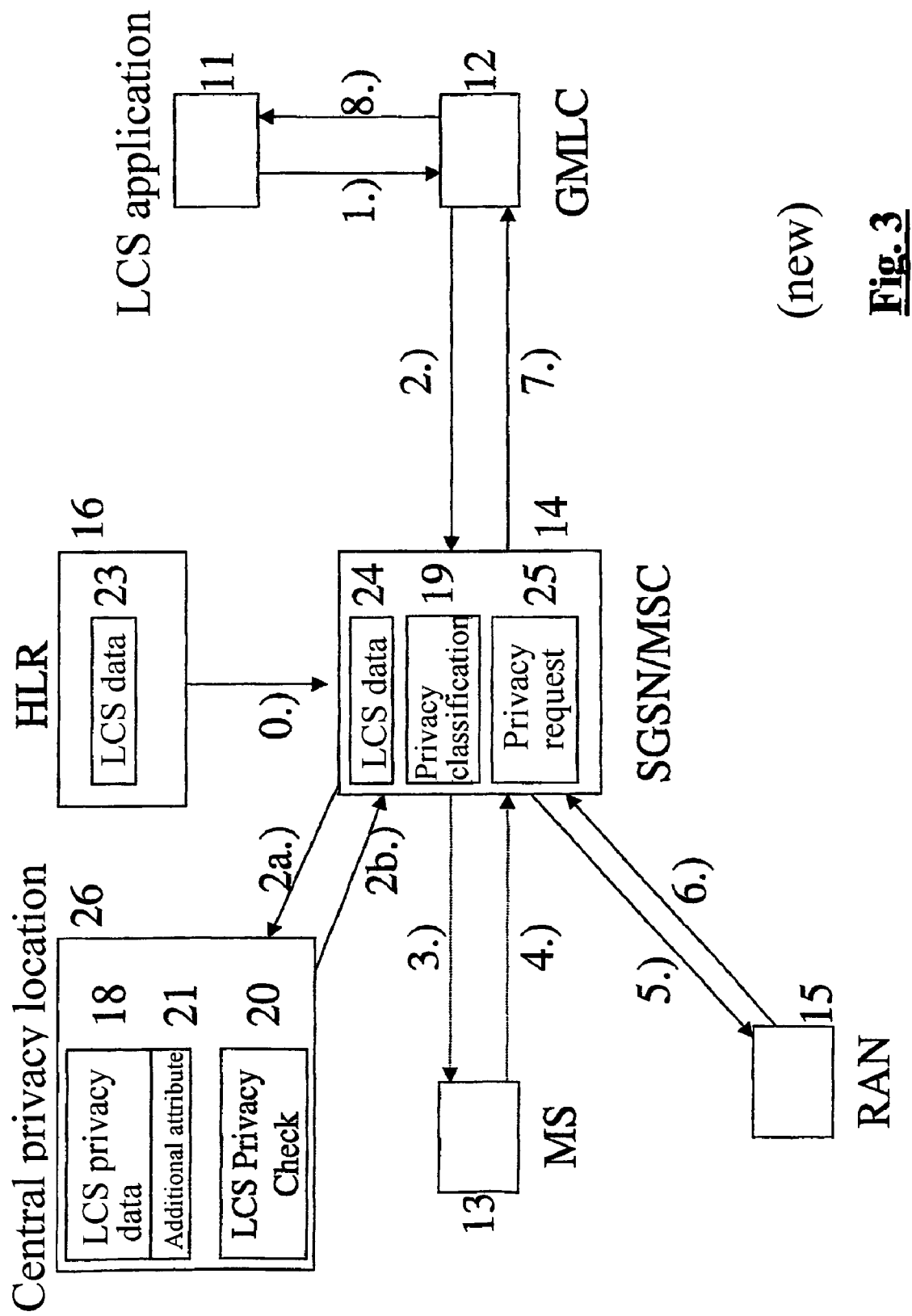
Fig. 3 (new)

DATA PROTECTION FOR POSITION-DEPENDENT SERVICES

CROSS REFERENCE TO RELATED APPLICATIONS

This application is the US National Stage of International Application No. PCT/DE02/00027 filed Jan. 8, 2002 and claims the benefit thereof. The application is incorporated by reference herein in its entirety.

FIELD OF INVENTION

The invention relates to methods and devices for interrogating the agreement of the mobile terminal user to the transfer of their position data to a requesting party.

BACKGROUND OF INVENTION

Privacy functions of the protection of the private sphere or other mobile terminal user by checking functions relating to the forwarding of the position of the mobile radio terminal The use of position data of aim a bale at Terminal user of a cellular mobile radio network for location dependants services such as for example information about the nearest gas station etc. (Location Services=LCS) is known from 3GPP-TS 23.271. However under some circumstances the user would like avoid any third party being able to interrogate their current position from the mobile radio network. Therefore the mobile terminal user needs a function which defines for any potential party requesting their position from the mobile radio network, whether the notification of this position data of the mobile terminal user to this interrogating party is generally allowed, is basically forbidden or can be allowed after verification with the mobile terminal user. This function is referred to as LCS User Privacy (also LCS user private sphere function).

In accordance with 3GPP Release 4 Standards TS 23.271 and TS 29.002 the LCS-User Privacy is stored for each subscriber in a Home Location Register (HLR) in a number of privacy classes and is downloaded by the HLR to the MSC or SGSN visited by the user, in which case an LCS user privacy function checks whether in the case of an interrogation about the position of the mobile radio terminal (Mobile Terminating Location Request MTLR) position data is to be transferred to the interrogating party from a GMLC. LCS privacy classes are provided for value added services, these being the call session-related class and the call session-unrelated class. In accordance with 3GPP Release 4 the user can specify for each of these two classes up to 240 LCS client IDs and for each client ID (identities potential parties requesting the position of the user) can define comprehensive specifications as to how the MSC/SGSN visited by the user is to perform the LCS user privacy check. For example it is possible to define that the user receives only one LCS notification (that is a notification that someone is requesting their position) or that the user receives an LCS verification (that is a verification to him before transfer of his position to the requesting party) and other options. If the LCS client ID is not stored in a list specified by the user, default behavior is executed in accordance with the user's specifications.

The LCS user privacy defined by 3GPP (3GPP Standard TS 23.271 and TS 29.002) needs relatively large amounts of memory space in the Home Location Register (HLR) of the mobile radio network and in the mobile switching center (MSC-SGSN) and generates a high load during copying of conditions relating to the transfer of position data of the user to a requester from the HLR to the switching center currently being visited by the user (visited MSC/SGSN). One of the reasons why the copying of the conditions is required is because checking of the conditions is undertaken in the switching center during a request for the position of a mobile radio terminal.

The entire checking of the LCS user privacy settings relates here only to the LCS client ID of the requesting LCS client from whom the position request is sent via the GMLC to the switching center.

Further information about the type of the requesting service is not taken into consideration in 3GPP Release 4, and just as little attention is given to the identity of the requester (Requester ID) and conditions associated with it as well as further test conditions such as keywords etc.

These additional conditions (additional attributes) relating to the transfer of position data of a user to a requester and the conditions in accordance with 3GPP Release 4, such as Client ID (LCS privacy data) are to be stored so that any number of additional attributes are possible without the memory space requirement in the HLR being further increased.

A further restriction on the LCS privacy specified in accordance with 3GPP Release 4 is that in the case of national or international roaming (the mobile radio subscriber is not in his home network and is using a location dependent service in the visited a mobile radio network) the use of the LCS privacy function in the visited switching center MSC/SGSN in which the mobile radio subscriber is currently registered is only possible to a restricted extent because the local LCS Client IDs are possibly not known in the HLR and are not correspondingly entered by the mobile radio subscriber in his LCS privacy data.

The approach currently evaluated, in accordance with FIG. 2 (Configuration 1) of storing the additional attributes in a separate LCS central privacy location, accessing this data of the LCS central privacy location from a GMLC and checking the LCS privacy data in the GMLC resolves the problem of restricted memory space in the HLR but presents the following problems to be resolved:

The start or the execution of the Location Subscriber Privacy function (LSPF) is required by 3GPP to be at the switching center MSC/SGSN but is shifted by configuration 1 to the GMLC or into the LCS central privacy location.

The incorporation of the classification of the LCS position request or the separation of the LCS privacy into call/session-related and call/session-unrelated classes in the test process required in accordance with 3GPP is not possible or only possible with considerable effort with Configuration 1 in accordance with FIG. 2. The notification of the current position determination or the demand for the permissibility of a position determination for the mobile subscriber involved, as required in 3GPP Release 4, is not possible with the configuration in accordance with FIG. 2 or is only possible with increased effort.

Each GMLC of any mobile radio network which is connected directly or indirectly to the mobile radio network in which the mobile switching center currently visited by the mobile subscriber is located, can initiate a position request for this mobile subscriber. If the test condition is applied and the result is evaluated in the GMLC, this requires a high level of trustworthiness of this GMLC.

A further use of the user interface of the mobile and terminal user based on Subscriber Controlled Input (SCI) to change his settings of the LCS privacy data in the HLR is not possible for changing his settings of the LCS privacy data in the LCS central privacy location or is only possible with increased effort.

In the case of national or international roaming (the Mobile subscriber is not in his home network and is using a location based service in the visited mobile radio network) it is only possible to use the test condition and to evaluate the result in the GMLC or in the LCS central privacy location by using the data which is stored in the LCS central privacy location in his home mobile radio network with increased effort.

If a number of GMLC and/or a number of LCS central privacy locations are used the assignment is unclear as to which GMLC is to access which LCS central privacy location.

There are the following problems which already exist but are not resolved by a configuration in accordance with FIG. 2:

Changes to the test conditions and the function for using the test conditions are associated with very high administrative effort for the network operator or are impossible if the LCS central privacy location and the network element in which the function for using the test conditions is executed are not collocated and/or cannot be synchronously administered.

3GPP Release 4 only specifies a LCS privacy on the basis of the LCS Client IDs. In the case of national or international roaming—the mobile subscriber is not in his home network and is using a location-based service in the visited mobile radio network) it is only possible to use the test condition and to evaluate the result in the MSC/SGSN in which the mobile subscriber is currently registered to a restricted extent, because the local LCS client IDs must have been known in the LCS central privacy location of the mobile subscriber or must have been correspondingly entered by the mobile subscriber in his LCS privacy data.

SUMMARY OF INVENTION

The object of the invention is to allow an efficient privacy request. The object is achieved by the claims.

In accordance with the invention the function for using the test conditions can lie in an LCS central privacy location where the associated test conditions or the LCS privacy data in accordance with 3GPP Release 4 with additional attributes (including for example the IN services type, the initiator, time dependencies or others) are stored. The LCS central privacy location administers items such as subscriber data records of mobile users of the home mobile radio network in which it is located. In the HLR the address of the LCS central privacy location responsible for the HLR and/or a mobile subscriber Identity are stored.

When a mobile subscriber registers with a switching center the address of the LCS central privacy location stored in the HLR is preferably copied into the visited switching center. The position request can be classified into an LCS privacy class (Call-Session Related Class, Call-Session Unrelated Class . . . ) in the switching center. The switching center usefully transfers to the LCS central privacy location the classification of the position request. Input Parameters for the Test conditions can be transferred from the position data requesting location (GMLC) to the switching center and these can be forwarded by the switching center—possibly together with further input parameters available in the switching center—to the LCS central privacy location. The use of the test conditions in the LCS central privacy location can be initiated by the switching center on the basis of a direct or an indirect position request. For initiation of the use of the test conditions the switching center usefully transfers the input parameters of the test conditions to the LCS central privacy location.

The additional attributes held in the LCS central privacy location make it possible to use LCS as well in the case of national or international roaming without the local LCS client IDs being known in the HLR or being entered correspondingly by the mobile subscriber in his LCS privacy data. The LCS central privacy location can be subdivided into a number of individual network elements. The assignment of which LCS central privacy location is responsible for which mobile subscriber is made by storing at the address of the LCS central privacy location in the HLR of the mobile radio subscriber or by a similar suitable method. The LCS central privacy location can be implemented at the SCP. A further use of the user interface of the mobile terminal user based on Subscriber Controlled Input (SCI) to change his settings of the LCS privacy data in the LCS central privacy location is made possible through an interface between the switching center and the HLR and between the HLR and the LCS central privacy location. If the LCS central privacy location is implemented at the SCP, this interface is already present.

BRIEF DESCRIPTION OF THE DRAWINGS

Further features and advantages of the invention are produced by the subsequent description of an exemplary embodiment with the enclosed drawings.

The drawings show:

FIG. 3 a schematic diagram of a variation in accordance with the invention of this LCS privacy check.

DETAILED DESCRIPTION OF INVENTION

Figure 1:
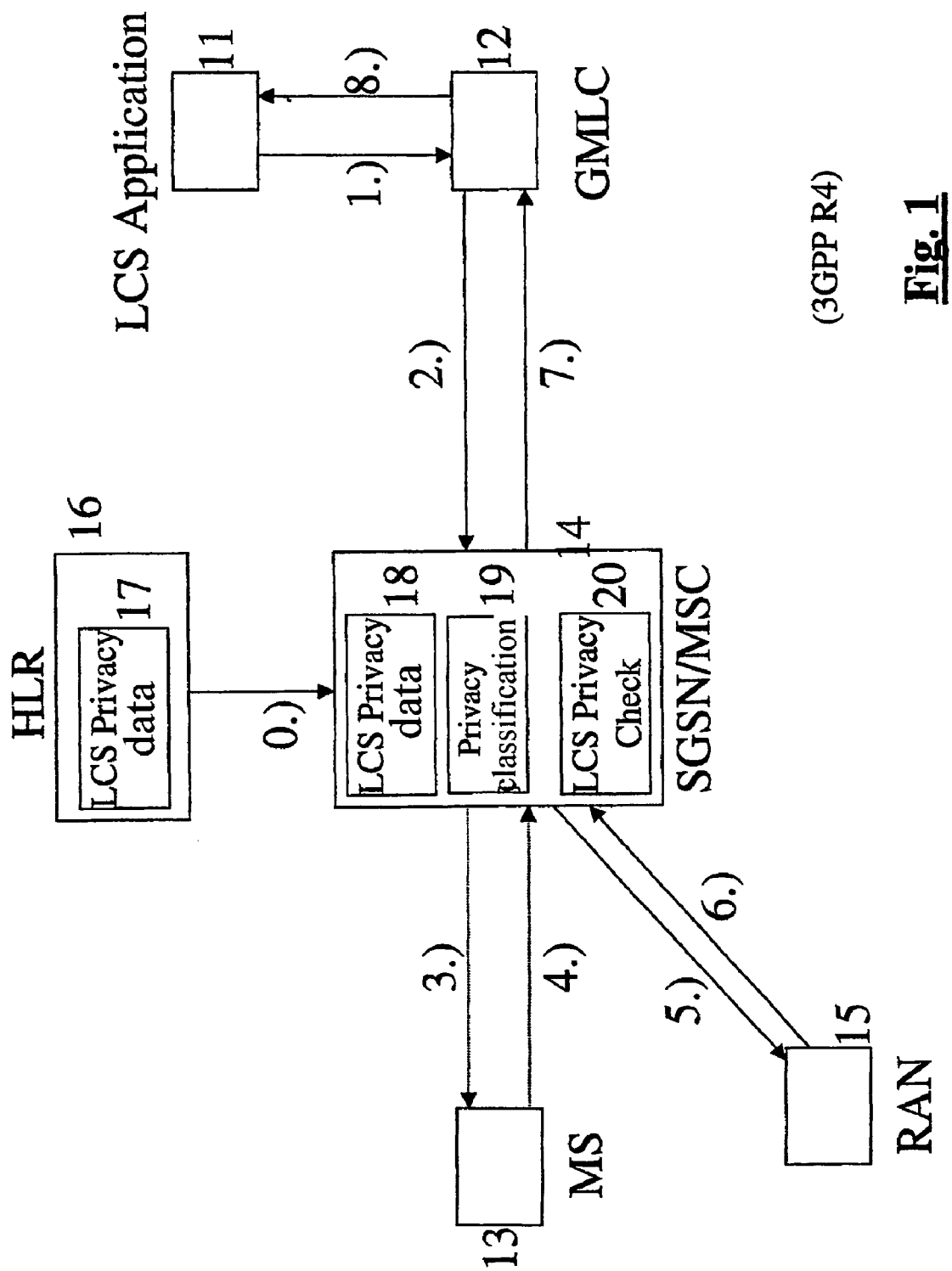
FIG. 1 an LCS privacy check in accordance with 3GPP R4.
Figure 2:
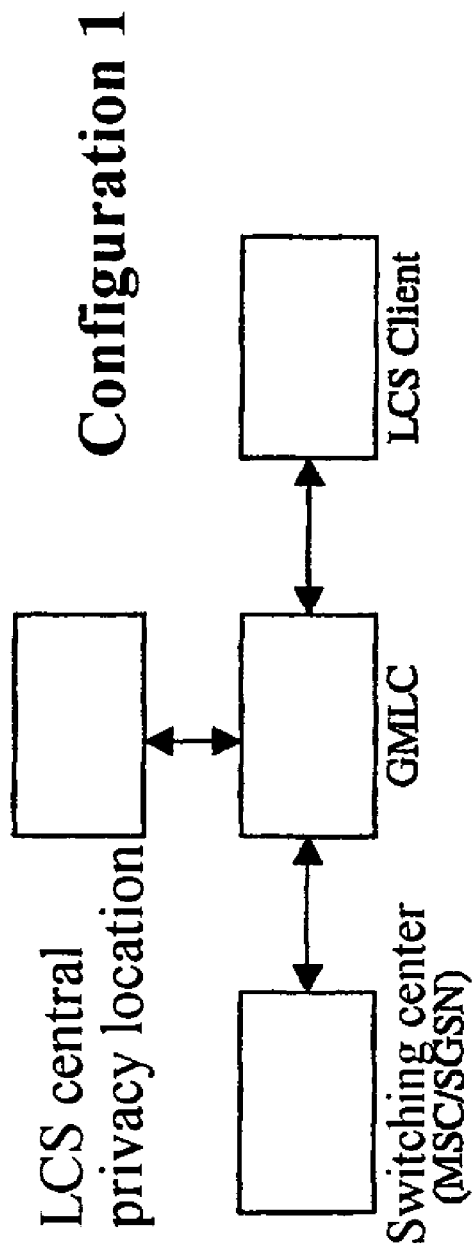
FIG. 2 a variation of the 3GPP R4 solution.

In FIG. 1 a request 1 is sent from an LCS application 11 to a position data request acceptance location (GMLC) 12 which forwards this request for position data in step 2 to a switching center (SGSN/MSC etc.) 14 currently being visited by a mobile subscriber (MS) 13. The switching center SGSN/MSC 14 has stored (e.g. at regular intervals) in a step 0 specifications downloaded from an HLR about mobile terminal users (LCS privacy data 18) which tell it whether to verify with the mobile subscriber terminal 13 before transferring the position of the mobile subscriber terminal to the requester 11.

Before the privacy data 18 is checked the position data request 2 is classified 19 in the switching center (MSC/SGSN) 14. For Value Added Services various LCS privacy classes are positively the call session-related class and the call session-unrelated class. The result of the classification determines which data of the privacy data 18 is taken into account. If the privacy checking 20 prescribes a verification of this type, in step 3 the switching center 14 asks the mobile terminal 13 whether the user of the mobile terminal 13 would like to grant his permission to allow the requester 11 to determine the position of his mobile terminal. This mobile terminal can either give an answer 4 to this request from the switching center 14 or under some circumstances cannot give an answer, if the mobile terminal is not in use for example, is switched off or is located in a radio coverage gap. If a transfer of the position of the mobile terminal to the requester 11 is basically allowed, is allowed with notification (step 3) or if an alternative to this is to allow it after agreement 4 has been obtained and agreement is available or if a alternatively it is specified that if no rejection of the agreement arrives the position is transferred, a transfer of the position of from the switching center 14 to the requester 11 can take place. The switching center 14 requests in step 5 from a RAN of a 3G network or a BSS of a 2G networks etc. the position of the mobile radio terminal 13 (for example as a result of the cell identity of the radio cell currently being used by the mobile terminal 13) and in step 6 obtains the current mobile radio terminal position in return. If the position is to be transferred to the requester 11, the switching center 14 transfers the data representing the position to the position data acceptance location GMLC 12 in step 7 which forwards this data without further conditions in step 8 to the requester 11 (if necessary specifying at the age of the position data provided the age has been determined by the position data determining location RAN/BSS 15 or the switching center 14).

FIG. 3 shows a configuration in accordance with the invention to improve the LCS privacy request:

The upwards compatibility of a mobile radio network in accordance with 3GPP Release 4 Standard to a mobile radio network with a configuration in accordance with the invention is possible.

As also in the solution shown in FIG. 1, a Home Location Register of the mobile radio network HLR 16 transfers on request or at regular intervals in a step 0 for a multiplicity of mobile subscribers to the switching center (e.g. currently being used by the mobile subscriber 13) SGSN/MSC 14 or (for regular transmission) to all switching centers a set of specifications (LCS data)23=24 which in FIG. 3 however specify how an LCS central privacy location 26 which is responsible for the privacy of the mobile terminal user 13 is to be contacted by stored verification specifications 24 (relating to a plurality of mobile terminal user identities, assigned to these by the identity of the mobile terminal 13 or of the mobile subscriber identity module of the mobile terminal 13)—for example the LCS data 24 includes an address of the LCS central privacy location. The fact that the privacy data is no longer stored in the HLR but in the LCS central privacy location (database server 26) allows the network load between HLR 16 and switching center MSC/SGSN 14 and the memory requirement in the HLR to be significantly reduced.

The variation of the execution sequence discussed for FIG. 1 in accordance with the invention can thus be as follows:

In step 0 LCS data 24 which contains address information of the LCS central privacy location responsible for the mobile station 13 in each case is transferred (on request or at regular intervals) from the Home Location Register HLR 16 to the switching center SGSN/MSC 14 for each mobile station 13 registered there.

There is a transfer 1 of an LCS service request from an LCS customer (requester 11) to the position data requesting location GMLC 12 and transfer of the required and optional data relating to the request (Client ID, IMSI/MSISDN, QoS, requester, . . . )

Subsequently, as in the method above, the request 2 is classified in exchange 14. By contrast with the above method however the LCS privacy is not checked in the switching center. After the classification the privacy request 2a is sent to the LCS central privacy location 26. The address of the LCS central privacy location 26 is taken from the LCS data 24.

In step 2a the switching center 14 sends a request 2a, which contains test conditions, such as a class of the request (Call/Session Related, Call/Session Unrelated . . . ) and additional test parameters received in the request 2, for example LCS client ID, initiator and LCS client type, for checking the privacy functions of the mobile radio terminal user 13, to the LCS central privacy location 26 for which the address is specified by the LCS data 24, or to a predefined LCS central privacy location 26.

In step 2b the LCS central privacy location 26 executes the check on the LCS privacy 20. The LCS privacy 20 can be checked in accordance with 3GPP R4 on the basis of the classification received and the Client ID of LCS application 11 received or above and beyond this, can use additional attributes 21, such as for example take account of the received LCS client type and/or initiator, and/or possibly additional locally-available test parameters—for example the current time (26).

These steps are followed by steps 3 through 8 already specified for FIG. 1 (verification 3,4 with mobile terminal 13, position determination 5,6, and if allowed for the mobile station 13, position data transfer 7,8).

As an alternative to the method specified above the LCS central privacy location 26 can be implemented at the SCP so that a user interface implemented by Subscriber Controlled Input (SCI) which can modify the LCS privacy data 18 in accordance with 3GPP R4 in the HLR, can also continue to be used unchanged for the LCS central privacy location 26 at the SCP or can be expanded.

As a further alternative to the method specified above the LCS central privacy location at 26 can be subdivided into a database which contains the LCS privacy data 18 and the additional attributes 21 and into an additional unit which executes the LCS privacy check 20.

As a further alternative to the method specified above the LCS privacy data, as described for FIG. 3 can be stored in the central privacy location 26, but to allow upwards compatibility with Home Location Registers HLR 16 which do not (yet support the inventive improvement of the LCS privacy, LCS privacy data 18 stored in the privacy central location 26 can be transferred and/or synchronized on request or at intervals in a suitable form, possibly in accordance with 3GPP Release 4 and by means of a suitable procedures such as for example an interface between central privacy location 26 and Home Location Register 16, so that the Home Location Register HLR 16 can transfer the LCS privacy data in a step 0 as described in FIG. 1, to a switching center 14. The upwards-compatible component of the LCS privacy check of the central privacy location at 26 is performed in accordance with the privacy classification 19 in the switching center 14 as described in FIG. 1 and the result is transferred as an additional input parameter or to the central privacy location 26 in step 2a.

As a further alternative to the method specified above the LCS privacy data 18 can remain in the Home Location Register 16, as described in FIG. 1 and only the additional attributes are stored in the central privacy location 26. The address of the central privacy location 26 is to be stored in the HLR. The combination of the results of the LCS privacy data check in the switching center 14 and the check on the additional attributes in the central privacy location 26 can be undertaken in the switching center 14 or in the central privacy location 26 and can depend on whether the mobile terminal user is located in his home mobile radio network or is using another network within or outside the home country.

The invention claimed is:

1. A method for requesting the agreement of a user of a mobile terminal of a mobile radio network to the transfer of their position data to a party requesting this position data, the method comprising:
   providing a central privacy location comprising a database server for storing privacy data regarding the mobile terminal, wherein said central privacy location constitutes a separate location from a Home Location Register for the mobile terminal;
   defining the privacy data stored in the database server at the central privacy location to assign to the mobile terminal at least one verification rule as to whether an agreement must be obtained on the mobile terminal side to forward the mobile terminal position to the requester;
   causing, by the switching center of the mobile radio network, in the case of the arrival of a request from a requester for the position of the mobile terminal in the switching center, the database server at the central privacy location to make a check on the basis of the privacy data stored there;
   sending the result of the check performed at the central privacy location to the switching center;
   sending, by the switching center, if the result at least indicates that an agreement must be obtained, a request for an agreement to the mobile terminal; and
   transmitting the position of the mobile terminal to the requester when an agreement is received from the mobile terminal by the switching center, and not transmitting the position of the mobile terminal to the requester when no agreement is received from the mobile terminal by the switching center, whereby the user of the mobile terminal of the mobile radio network can selectively approve a transfer or position data of the mobile terminal to the party requesting said position data.

2. The method according to claim 1, wherein the request arrives at a position data acceptance location of the mobile radio network.

3. The method according to claim 1, wherein the switching center is an MSC (Mobile Switching Center) or SGSN (Serving GPRS (General Pocket Radio Service) Support Node).

4. The method according to claim 1, further comprising:
   requesting, by the switching center, the position of the mobile terminal from a BSS (Base Station System) or RAN (Regional Area Network) of the mobile radio network.

5. The method according to claim 1, wherein
   a verification rules specification can only comprise a prespecified set of different instructions, especially one of the following instructions: position data transfer without notification, position data transfer with notification to the mobile terminal, position data transfer only after agreement of the mobile station or if no response is received from the mobile station, only transfer position data with the agreement of the mobile station.

6. The method according to claim 1, further comprising:
   storing, for a multiplicity of mobile subscriber identity modules and/or mobile stations, verification rules specifications and identity specifications for the mobile terminal or for a mobile subscriber identity module contained in it.

7. The method according to claim 1, further comprising:
   regularly receiving, by a switching center, especially a Visitor Location Register of a switching center from the Home Location Register of a mobile network the telecommunications address of the database server or receiving it when a mobile terminal registers at the switching center or its Visitor Location Register VLR.

8. The method according to claim 1, wherein position data is only transferred to a requester if this is allowed for the period of the recording of the position according to stored conditions for the user of the mobile station or its mobile subscriber identity module through attributes stored in the database.

9. The method according to claim 1, further comprising:
   changing the conditions by the user via their mobile terminal or another terminal by mobile radio, WAP (Wireless Application Protocol), Internet, fixed network or in another way.

10. The method according to claim 1, wherein the switching center is the mobile switching center currently being used by the mobile terminal.

11. The method according to claim 1, wherein the database server is arranged in an SCP (Service Control Point).

12. The method according to claim 1, wherein the database server is a database comprising the verification rules specifications and possibly additional attributes and comprising an additional unit which makes the check.

13. The method according to claim 1, further comprising:
   storing the entries in the database server but, to make upwards compatibility with a Home Location Register, which does not support the improvement of the LCS (Locator Services) Privacy in accordance with the invention, transmitting entries to a mobile network Home Location Register on request or at regular intervals, so that the mobile network Home Location Register can transmit the entries to a switching center.

14. The method according to claim 13, further comprising performing a proportion of the checks in accordance with a classification in the switching center; and
   transmitting the result as an additional input parameter to the database server.

15. The method according to claim 14, further comprising storing the entries in a Home Location Register;
   storing only additional attributes in the database server; and
   storing the address of the database server in the Home Location Register.

* * * * *